United States Patent
Dow et al.

(10) Patent No.: US 10,902,260 B2
(45) Date of Patent: Jan. 26, 2021

(54) ESTIMATING A HEIGHT OF A CLOUD DEPICTED IN AN IMAGE

(71) Applicant: INTERNATIONAL BUSINESS MACHINES CORPORATION, Armonk, NY (US)

(72) Inventors: Eli Michael Dow, Wappingers Falls, NY (US); Michael E. Henderson, South Salem, NY (US); Campbell D. Watson, Brooklyn, NY (US); Guillaume Auger, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 47 days.

(21) Appl. No.: 16/203,742

(22) Filed: Nov. 29, 2018

(65) Prior Publication Data

US 2020/0175251 A1 Jun. 4, 2020

(51) Int. Cl.
*G06K 9/00* (2006.01)
*G06F 16/587* (2019.01)
(Continued)

(52) U.S. Cl.
CPC ........ *G06K 9/0063* (2013.01); *G06F 16/587* (2019.01); *G06K 9/6215* (2013.01);
(Continued)

(58) Field of Classification Search
CPC combination set(s) only.
See application file for complete search history.

(56) References Cited

U.S. PATENT DOCUMENTS 6,504,951 B1    1/2003    Luo et al.
8,594,375 B1 *   11/2013    Padwick .............. G06K 9/0063
                                                                                                                                         382/103

(Continued)

OTHER PUBLICATIONS

Anonymously Disclosed "Dynamic Image Context Evaluation and Prioritization in Cloud", IP.com No. IPCOM000235642D; Publication Date; Mar. 17, 2014; 3 pgs.

(Continued)

*Primary Examiner* — Sean T Motsinger
(74) *Attorney, Agent, or Firm* — Cantor Colburn LLP; Teddi Maranzano

(57) ABSTRACT

Methods, systems and computer program products for estimating a height of a cloud depicted in an image are provided. Aspects include extracting metadata from the image, the metadata including a latitude, a longitude, and heading of a camera that captured the image and a time at which the image was captured. Aspects also include creating a three-dimensional model of a landscape depicted in the image and inserting a simulated cloud into the three-dimensional model. Aspects further include creating a simulated image of the three-dimensional model, including the simulated cloud and determining a similarity score of the cloud depicted in the image to the simulated cloud in the simulated image. Based on a determination that the similarity score exceeds a threshold value, aspects include providing a height of the simulated cloud in the three-dimensional model as the height of the cloud depicted in the image.

20 Claims, 6 Drawing Sheets

(51) Int. Cl.
　　　*G06T 7/60*　　(2017.01)
　　　*G06K 9/62*　　(2006.01)
　　　*G06T 17/05*　　(2011.01)

(52) U.S. Cl.
　　　CPC ............ *G06T 7/60* (2013.01); *G06T 17/05* (2013.01); *G06T 2207/10032* (2013.01); *G06T 2207/30192* (2013.01)

(56) References Cited

U.S. PATENT DOCUMENTS

| | | | |
|---|---|---|---|
| 8,947,427 | B2 | 2/2015 | Shuster et al. |
| 9,430,872 | B2 | 8/2016 | Raif et al. |
| 9,574,874 | B2* | 2/2017 | Son .................. G06T 7/55 |
| 9,798,928 | B2 | 10/2017 | Carr et al. |
| 2013/0329940 | A1* | 12/2013 | Nakamura .......... G06K 9/0063 |
| | | | 382/100 |
| 2014/0320607 | A1* | 10/2014 | Hamann ................ H04N 5/238 |
| | | | 348/47 |
| 2015/0010200 | A1* | 1/2015 | Kawahara ................ G06T 7/73 |
| | | | 382/100 |
| 2015/0154467 | A1 | 6/2015 | Feng et al. |
| 2016/0127642 | A1* | 5/2016 | Schechner ............. H04N 5/247 |
| | | | 348/38 |
| 2016/0363696 | A1* | 12/2016 | Dao ....................... G01W 1/10 |
| 2017/0249783 | A1 | 8/2017 | Mach Shepherd et al. |
| 2017/0299686 | A1 | 10/2017 | Bertin et al. |
| 2017/0351970 | A1* | 12/2017 | Abedini ................ G06T 1/0007 |
| 2019/0158011 | A1* | 5/2019 | West .................... G06N 20/20 |
| 2020/0175251 | A1* | 6/2020 | Dow .................... G06F 16/587 |

OTHER PUBLICATIONS

Anonymously Disclosed "Method and apparatus to facilitate photographing in crowded tourist attractions with AR techniques", IP.com No. IPCOM000248948D; Publication Date: Jan. 24, 2017; 10 pgs.

Anonymously Disclosed "Method and System for advanced photographic processing and optimization", IP.com No. IPCOM000248498D; Publication Date: Dec. 9, 2016; 6 pgs.

Dinkov, Davis et al. "3D Modelling and Visualization for Landscape Simulation", Proceedings, 6th International Conference on Cartography and GIS, Jun. 13-17, 2016, ISSN: 1314-0604, pp. 320-333.

Mell, Peter et al. "The NIST Definition of Cloud Computing", National Institute of Standards and Technology, U.S. Department of Commerce; Sep. 2011; 7 pgs.

Rolin, P. et al., "Viewpoint Simulation for Camera Pose Estimation from an Unstructured Scene Model", URL: https://members.loria.fr/FSur/articles/rolin15viewpoint.pdf; 2016; 8 pgs.

* cited by examiner

ESTIMATING A HEIGHT OF A CLOUD DEPICTED IN AN IMAGE

BACKGROUND

The present invention generally relates to image analysis, and more specifically, to estimating the height of a cloud depicted in an image.

Currently, it is not possible to reliably estimate cloud altitude from a single still photo without special reference marks or objects in the sky at known heights. Cloud altitude is an important metric for determining if weather models are producing high skill outputs, and accurate estimation is critical for aviation safety.

Existing sensors, like ceilometers which are upward-pointing lasers, cost hundreds to thousands of dollars and require expert technicians to install and repair. A cheaper method is to use still photo images from multiple cameras and image recognition software to detect the speed and direction of cloud movement, and infer cloud base height via triangulation. While this method is less expensive, it requires careful initialization because each camera must be pointing to the same area of the sky, and each camera must be located a known distance apart.

SUMMARY

Embodiments of the present invention are directed to a computer-implemented method for estimating the height of a cloud depicted in an image. The computer-implemented method includes extracting metadata from the image, the metadata including a latitude, a longitude, and heading of a camera that captured the image and a time at which the image was captured. The computer-implemented method also includes creating a three-dimensional model of a landscape depicted in the image and inserting a simulated cloud into the three-dimensional model. The computer-implemented method further includes creating a simulated image of the three-dimensional model, including the simulated cloud and determining a similarity score of the cloud depicted in the image to the simulated cloud in the simulated image. Based on a determination that the similarity score exceeds a threshold value, the computer-implemented method includes providing a height of the simulated cloud in the three-dimensional model as the height of the cloud depicted in the image.

Embodiments of the present invention are directed to a system estimating a height of a cloud depicted in an image. The system includes a memory having computer readable computer instructions, and a processor for executing the computer readable instructions. The computer readable instructions include instructions for extracting metadata from the image, the metadata including a latitude, a longitude, and heading of a camera that captured the image and a time at which the image was captured. The computer readable instructions also include creating a three-dimensional model of a landscape depicted in the image and inserting a simulated cloud into the three-dimensional model. The computer readable instructions further include creating a simulated image of the three-dimensional model, including the simulated cloud and determining a similarity score of the cloud depicted in the image to the simulated cloud in the simulated image. Based on a determination that the similarity score exceeds a threshold value, the computer readable instructions include providing a height of the simulated cloud in the three-dimensional model as the height of the cloud depicted in the image.

Embodiments of the invention are directed to a computer program product for estimating the height of a cloud depicted in an image, the computer program product comprising a computer readable storage medium having program instructions embodied therewith. The program instructions are executable by a processor to cause the processor to perform a method. A non-limiting example of the method includes extracting metadata from the image, the metadata including a latitude, a longitude, and heading of a camera that captured the image and a time at which the image was captured. The method also includes creating a three-dimensional model of a landscape depicted in the image and inserting a simulated cloud into the three-dimensional model. The method further includes creating a simulated image of the three-dimensional model, including the simulated cloud and determining a similarity score of the cloud depicted in the image to the simulated cloud in the simulated image. Based on a determination that the similarity score exceeds a threshold value, the method includes providing a height of the simulated cloud in the three-dimensional model as the height of the cloud depicted in the image.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
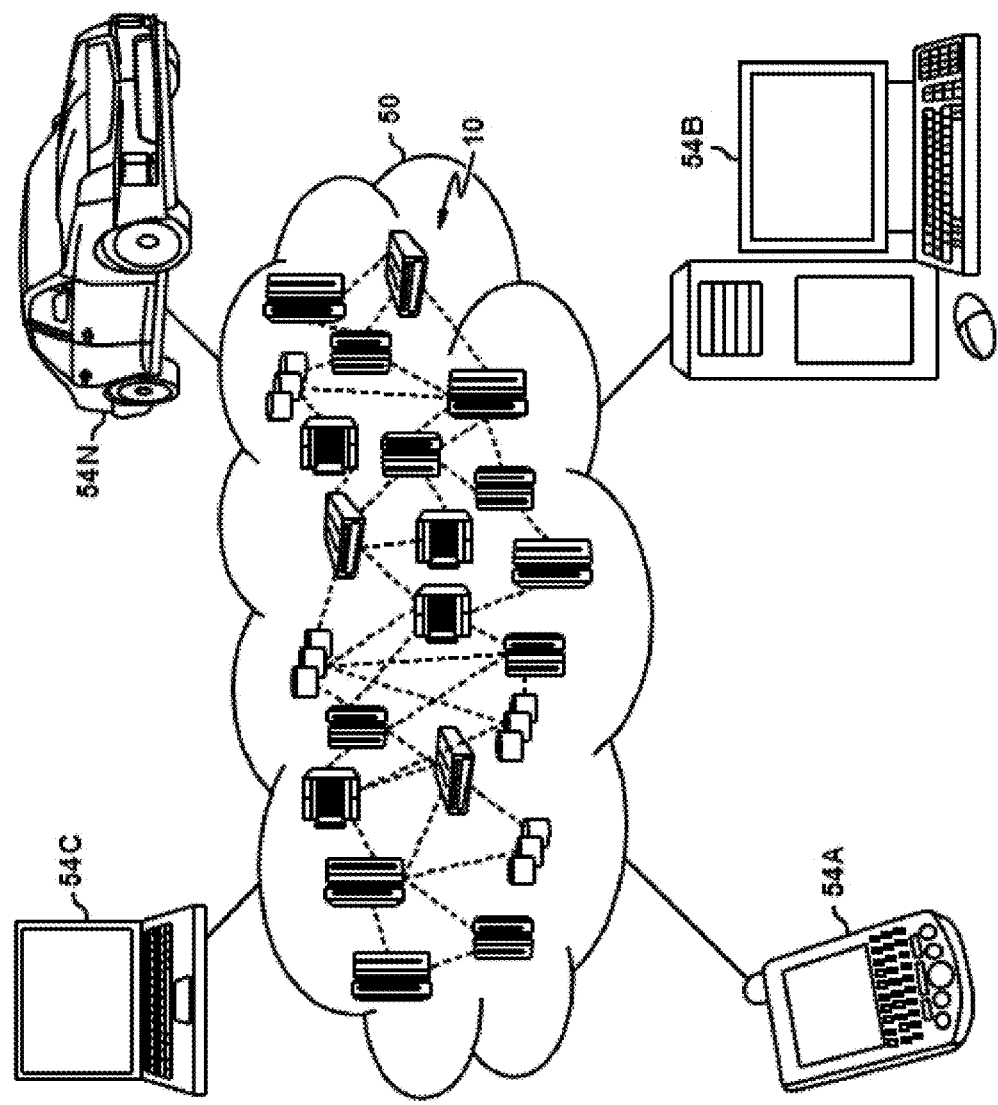
FIG. 1 depicts a cloud computing environment according to one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
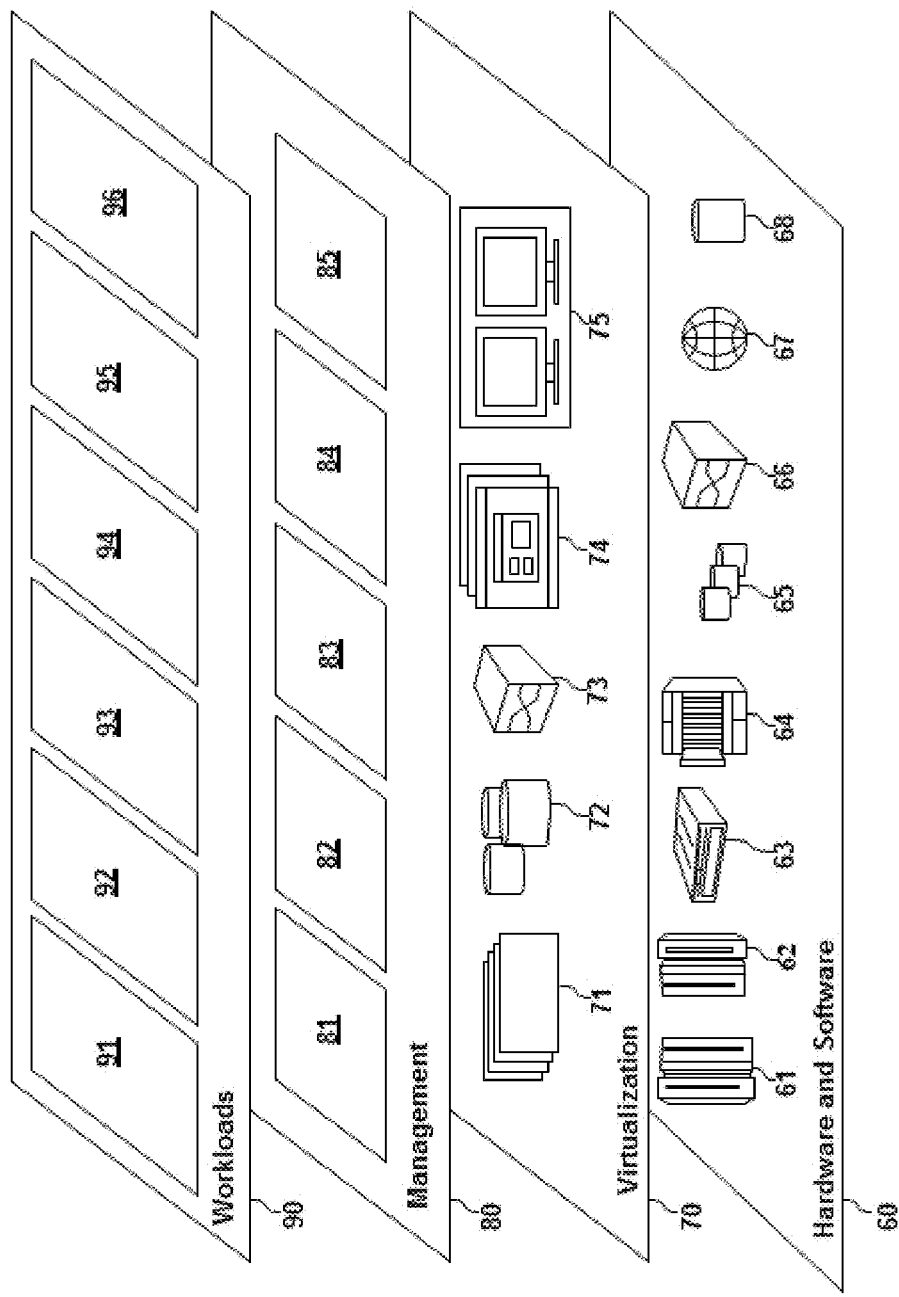
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and image analysis 96.

Figure 3:
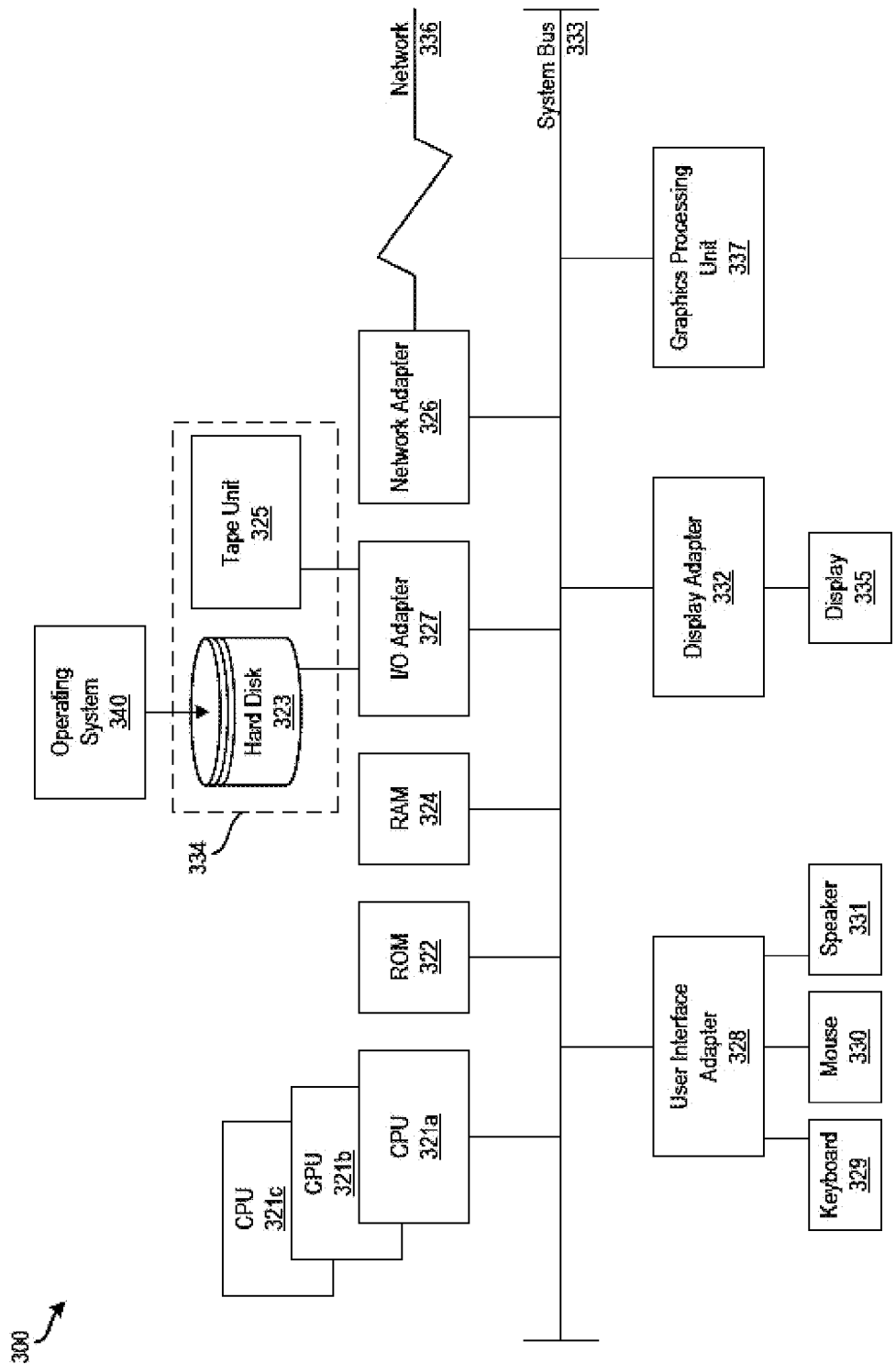
FIG. 3 depicts a block diagram of a computer system for use in implementing one or more embodiments of the present invention.

Referring to FIG. 3, there is shown an embodiment of a processing system 300 for implementing the teachings herein. In this embodiment, the system 300 has one or more central processing units (processors) 21a, 21b, 21c, etc. (collectively or generically referred to as processor(s) 21). In one or more embodiments, each processor 21 may include a reduced instruction set computer (RISC) microprocessor. Processors 21 are coupled to system memory 34 and various other components via a system bus 33. Read only memory (ROM) 22 is coupled to the system bus 33 and may include a basic input/output system (BIOS), which controls certain basic functions of system 300.

FIG. 3 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. I/O adapter 27, hard disk 23, and tape storage device 25 are collectively referred to herein as mass storage 24. Operating system 40 for execution on the processing system 300 may be stored in mass storage 24. A network adapter 26 interconnects bus 33 with an outside network 36 enabling data processing system 300 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments, the processing system 300 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel.

Thus, as configured in FIG. 3, the system 300 includes processing capability in the form of processors 21, storage capability including system memory 34 and mass storage 24, input means such as keyboard 29 and mouse 30, and output capability including speaker 31 and display 35. In one embodiment, a portion of system memory 34 and mass storage 24 collectively store an operating system coordinate the functions of the various components shown in FIG. 3.

In exemplary embodiments, a method to determine a cloud base height from a single image from a single camera in combination with three-dimensional visualization software is provided. The method only requires a georeferenced image, such as that provided from a single camera, paired with three-dimensional visualization software. In exemplary embodiments, a photograph, or image, is received and a three-dimensional model of the topography at the point a photo was taken is created and simulated clouds are inserted into the model. In one embodiment, the characteristics of the simulated clouds are determined according to parameters estimated from a hind-cast at the location of the photo. Based on the three-dimensional model a simulated photograph is created that illustrates the same area and perspective as the received photograph. The cloud type and height in the three-dimensional model is iteratively adjusted and image differencing metrics are applied to determine if the digital photo and three-dimensional simulated image are similar until a converged solution occurs. When a threshold level of similarity between the cloud in the simulated photograph and the cloud in the received image is reached, a height of the clouds used in the closest three-dimensional simulation and be provided as the estimated height of the cloud shown in the photograph.

In exemplary embodiments, a system for estimating the height of a cloud depicted in an image in accordance with an embodiment is shown. In one or more embodiments of the present invention, the method 400 may be embodied in software that is executed by computer elements located within a network that may reside in the cloud, such as the cloud computing environment 50 described hereinabove and illustrated in FIGS. 1 and 2. In other embodiments, the computer elements may reside on a computer system or processing system, such as the processing system 300 described hereinabove and illustrated in FIG. 3, or in some other type of computing or processing environment.

Figure 4:
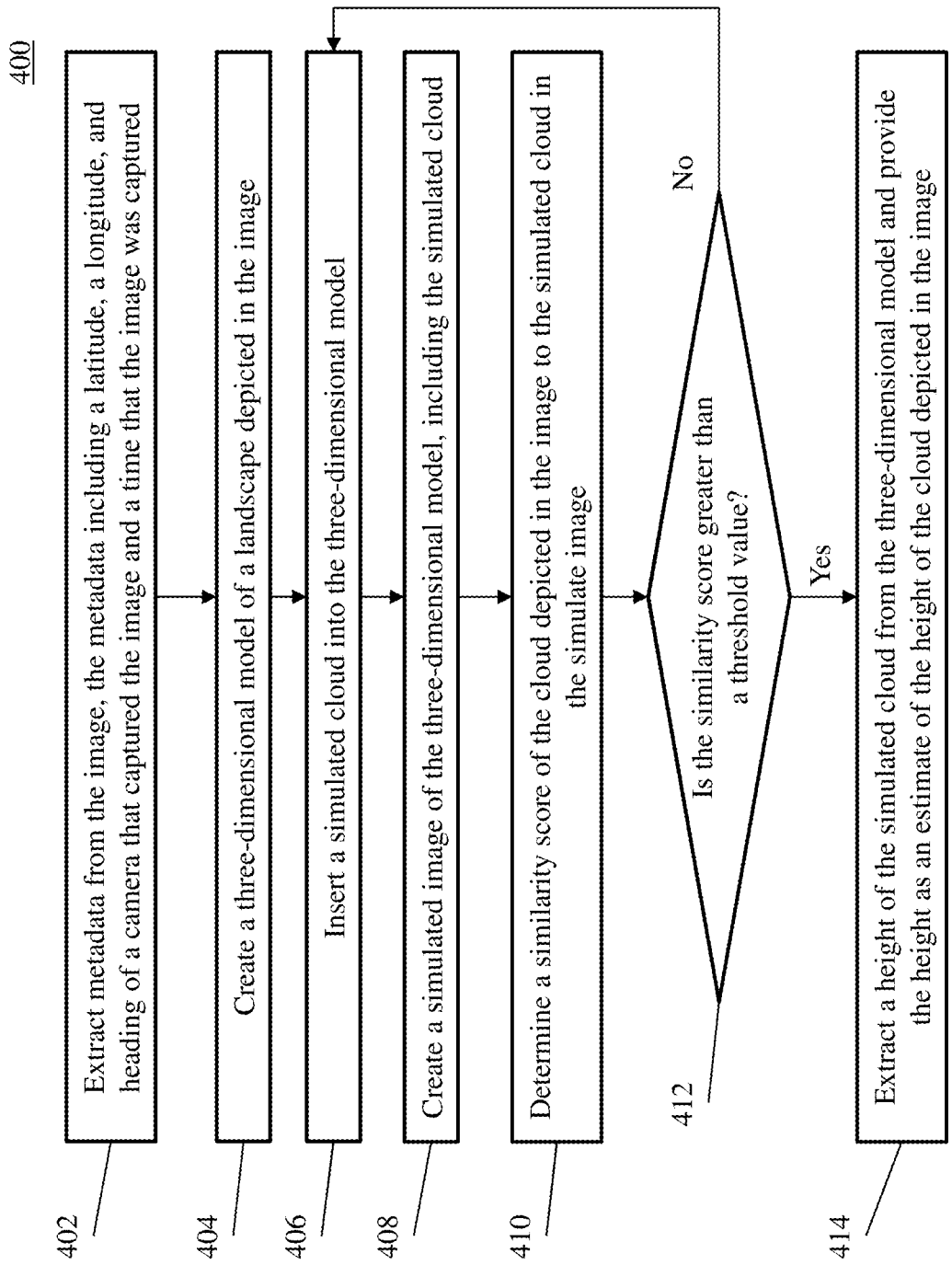
FIG. 4 depicts a flow diagram of a method for estimating the height of a cloud depicted in an image according to one or more embodiments of the invention.
Figure 5:
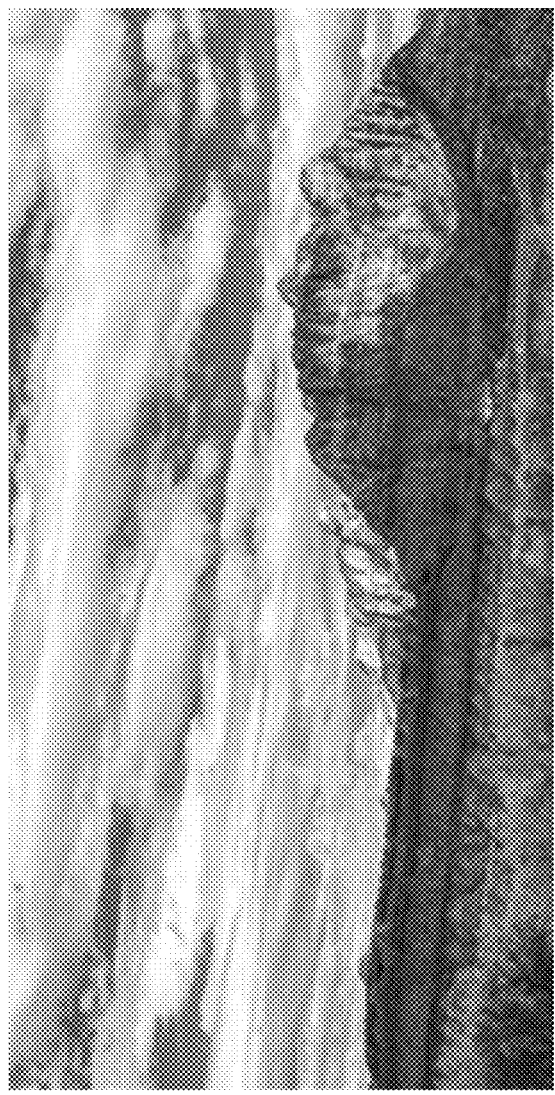
FIG. 5 depicts an image that includes a cloud according to one or more embodiments of the invention.
Figure 6:
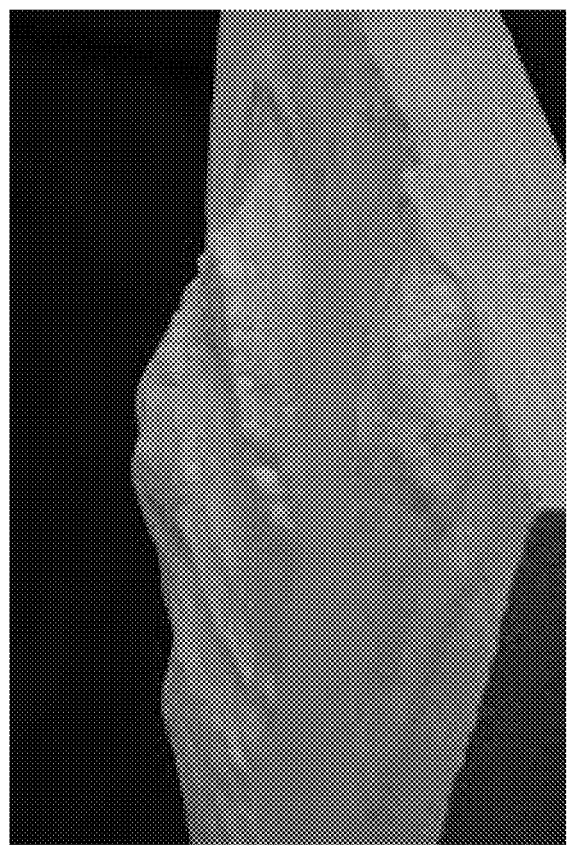
FIG. 6 depicts a three dimensional model of a landscape depicted in an image according to one or more embodiments of the invention.

Turning now to FIG. 4, a flow diagram of a method 400 for estimating the height of a cloud depicted in an image, such as the image 500 depicted in FIG. 5, is shown. The image 500 is merely exemplary in nature and any image depicting a landscape and a cloud can be used. The method 400 begins at block 402 and includes extracting metadata from the image. In exemplary embodiments, the metadata includes a latitude, a longitude, and heading of a camera that captured the image at a time that the image was captured. The method 400 also includes creating a three-dimensional model of a landscape depicted in the image, such as the three-dimensional model 600 depicted in FIG. 6, as shown at block 404. The three-dimensional model 600 includes three-dimensional representations of buildings and landscape features depicted in the image 500 used to create the three-dimensional model 600. In exemplary embodiments, the three-dimensional model is created using three-dimensional modeling software such as Unity3D™ the model can be created based on information extracted from the captured image and/or from metadata extracted from the image. The information extracted from the captured image includes the topography of a landscape depicted in the image, which can include one or more object such as buildings, trees, and the like. In exemplary embodiments, the topography is obtained from a digital elevation model (DEM) surrounding the location georeferenced in the photograph. In exemplary embodiments, the metadata extracted from the image is used to render the sun in the appropriate place relative to the virtual camera once the three-dimensional model is created.

Next, as shown at block 406, the method 400 includes inserting a simulated cloud into the three-dimensional model. In one embodiment, the type of simulated cloud inserted into the three-dimensional model can be determined at least in part based on a satellite image including the latitude and longitude at the time that the image was captured. In another embodiment, the type of simulated cloud inserted into the three-dimensional model can be determined at least in part based on a weather forecast for the latitude and longitude at the time that the image was captured. In a further embodiment, the three-dimensional model is created based on data extracted from a second image captured at the latitude, the longitude, and the heading, wherein the second image depicts a clear sky. As shown at block 408, the method 400 also includes creating a simulated image of the three-dimensional model, including the simulated cloud. The simulated image is created from the same latitude, longitude, and heading of the camera as the image received. Next, as shown at block 410, the method 400 includes determining a similarity score of the cloud depicted in the image to the simulated cloud in the simulated image. In exemplary embodiments, image comparison software is used to determine the similarity score. Using a similarity score for the embodiment wherein cloud height was generated for a 3D model weather forecast under varying conditions, one can evaluate which forecast configuration most closely matches reality for cloud height elevation using the image as the gold standard. In this way, the forecast model can be tuned iteratively using an image or collection of images and corresponding forecasts (e.g., by supervised machine learning approach).

The method 400 also includes determining if the similarity score exceeds a threshold value, as shown at decision block 412. Based on a determination that the similarity score exceeds the threshold value, the method 400 includes extracting a height of the simulated cloud from the three-dimensional model and providing the height as an estimate of the height of the cloud depicted in the image, as shown at block 414. Otherwise, based on a determination that the similarity score does not exceed a threshold value, the method 400 returns to block 406 and inserts another cloud in the three-dimensional model. In exemplary embodiments, the method iteratively inserts simulated clouds into the three-dimensional model, creates a simulated image of the three-dimensional model, and determines a similarity score of the cloud depicted in the image to the simulated cloud in the simulate image until the similarity score is above the threshold value. During each iteration, one or more of the type, size, and location of the inserted cloud can be changed.

In exemplary embodiments, when the topography of the landscape shown in the image is flat, i.e., there are no objects such as buildings, mountains, trees, etc. depicted, the three-dimensional model can be created based at least in part on identifying a horizon line. The horizon line can be found by analyzing multiple still frames captured by a single camera in a single location but with the tilt/roll/yaw of the camera in multiple positions.

In exemplary embodiments, a method for estimating the height of a cloud depicted in an image includes an initialization phase and an estimation phase. The initialization phase includes selecting an image from a clear-sky day from a camera and extracting metadata from an image, the metadata including the location and time of image capture. Next, the initialization phase includes reproducing the landscape in a three-dimensional model. Once the three-dimensional model is complete, a database of simulated images is created with a virtual camera positioned in an identical location using geolocation, pointing in the same direction and with the same focal length. The database of images is created by inserting numerous possible cloud arrangements into the three-dimensional model. In one embodiment, the database of simulated images includes a plurality of simulated images that each have simulated clouds with different characteristics, such as cloud type, height, width and the like. The numerous possible cloud arrangements can be determined based upon satellite data, or knowledge from a weather model forecast.

In exemplary embodiments, the estimation phase includes receiving an image from the camera depicting clouds. Next, image matching software is used to identify the simulated image in the database that most closely resembles clouds in the received image. Finally, a cloud height estimate is determined based on the cloud height used in the three-dimensional model that corresponds to the simulated image in the database that most closely resembles clouds.

Additional processes may also be included. It should be understood that the processes depicted in FIG. 4 represent an illustration and that other processes may be added or existing processes may be removed, modified, or rearranged without departing from the scope and spirit of the present disclosure.

One software approach is to use a supervised machine learning approach to iteratively evaluate multiple weather model parameterizations to converge on the model configuration that simulates cloud type, shape and height which most closely resemble the clouds in the provided image/s. This evaluation process may run for a fixed number of iterations or for a finite number of compute resource consumption.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for estimating a height of a cloud depicted in an image, the method comprising:
    extracting metadata from the image, the metadata including a latitude, a longitude, and heading of a camera that captured the image and a time at which the image was captured;
    creating a three-dimensional model of a landscape depicted in the image;
    inserting a simulated cloud into the three-dimensional model;
    creating a simulated image of the three-dimensional model, including the simulated cloud;
    determining a similarity score of the cloud depicted in the image to the simulated cloud in the simulated image; and
    based on a determination that the similarity score exceeds a threshold value, providing a height of the simulated cloud in the three-dimensional model as the height of the cloud depicted in the image.

2. The computer-implemented method of claim 1, wherein the method further comprises iteratively repeating:
    inserting a second simulated cloud into the three-dimensional model;
    creating a second simulated image of the three-dimensional model, including the second simulated cloud; and
    determining a second similarity score of the cloud depicted in the image to the second simulated cloud in the simulate image until the second similarity score is above the threshold value.

3. The computer-implemented method of claim 1, wherein a type of the simulated cloud inserted into the three-dimensional model is determined at least in part based on a satellite image including the latitude and longitude at the time that the image was captured.

4. The computer-implemented method of claim 1, wherein a type of the simulated cloud inserted into the three-dimensional model is determined at least in part based on a weather forecast for the latitude and longitude at the time that the image was captured.

5. The computer-implemented method of claim 1, wherein the three-dimensional model is created based on data extracted from the image.

6. The computer-implemented method of claim 1, wherein the three-dimensional model is created based on data extracted from a second image captured at the latitude, the longitude, and the heading, wherein the second image depicts a clear sky.

7. The computer-implemented method of claim 1, further comprising creating a database of simulated images, each simulated image having simulated clouds with different characteristics.

8. The computer-implemented method of claim 1, wherein the three-dimensional model is created by obtaining an appropriate digital elevation model for the latitude, the longitude, and the heading of the camera at the time at which the image was captured.

9. A system comprising:
    a processor communicatively coupled to a memory, the processor configured to:
    extract metadata from an image depicting a cloud, the metadata including a latitude, a longitude, and heading of a camera that captured the image and a time at which the image was captured;
    create a three-dimensional model of a landscape depicted in the image;
    insert a simulated cloud into the three-dimensional model;
    create a simulated image of the three-dimensional model, including the simulated cloud;
    determine a similarity score of the cloud depicted in the image to the simulated cloud in the simulated image; and
    based on a determination that the similarity score exceeds a threshold value, provide a height of the simulated cloud in the three-dimensional model as the height of the cloud depicted in the image.

10. The system of claim 9, wherein the processor is further configured to iteratively:
    insert a second simulated cloud into the three-dimensional model;
    create a second simulated image of the three-dimensional model, including the second simulated cloud; and
    determine a second similarity score of the cloud depicted in the image to the second simulated cloud in the simulate image until the second similarity score is above the threshold value.

11. The system of claim 9, wherein a type of the simulated cloud inserted into the three-dimensional model is determined at least in part based on a satellite image including the latitude and longitude at the time that the image was captured.

12. The system of claim 9, wherein a type of the simulated cloud inserted into the three-dimensional model is determined at least in part based on a weather forecast for the latitude and longitude at the time that the image was captured.

13. The system of claim 9, wherein the three-dimensional model is created based on data extracted from the image.

14. The system of claim 9, wherein the three-dimensional model is created based on data extracted from a second image captured at the latitude, the longitude, and the heading, wherein the second image depicts a clear sky.

15. The system of claim 9, wherein the processor is further configured to create a database of simulated images, each simulated image having simulated clouds with different characteristics.

16. A computer program product comprising a computer readable storage medium having program instructions embodied therewith the program instructions executable by a computer processor to cause the computer processor to perform a method comprising:
- extracting metadata from an image depicting a cloud, the metadata including a latitude, a longitude, and heading of a camera that captured the image and a time at which the image was captured;
- creating a three-dimensional model of a landscape depicted in the image;
- inserting a simulated cloud into the three-dimensional model;
- creating a simulated image of the three-dimensional model, including the simulated cloud;
- determining a similarity score of the cloud depicted in the image to the simulated cloud in the simulated image; and
- based on a determination that the similarity score exceeds a threshold value, providing a height of the simulated cloud in the three-dimensional model as the height of the cloud depicted in the image.

17. The computer program product of claim 16, wherein the method further comprises iteratively repeating:
- inserting a second simulated cloud into the three-dimensional model;
- creating a second simulated image of the three-dimensional model, including the second simulated cloud; and
- determining a second similarity score of the cloud depicted in the image to the second simulated cloud in the simulate image until the second similarity score is above the threshold value.

18. The computer program product of claim 16, wherein a type of the simulated cloud inserted into the three-dimensional model is determined at least in part based on a satellite image including the latitude and longitude at the time that the image was captured.

19. The computer program product of claim 16, wherein a type of the simulated cloud inserted into the three-dimensional model is determined at least in part based on a weather forecast for the latitude and longitude at the time that the image was captured.

20. The computer program product of claim 16, wherein the three-dimensional model is created based on data extracted from the image.

* * * * *